US011151101B2

United States Patent
Diaconu et al.

(10) Patent No.: US 11,151,101 B2
(45) Date of Patent: Oct. 19, 2021

(54) ADJUSTING GROWTH OF PERSISTENT LOG

(71) Applicant: Microsoft Technology Licensing, LLC, Redmond, WA (US)

(72) Inventors: Cristian Diaconu, Kirkland, WA (US); Alejandro Hernandez Saenz, Kirkland, WA (US)

(*) Notice: Subject to any disclaimer, the term of this patent is extended or adjusted under 35 U.S.C. 154(b) by 265 days.

(21) Appl. No.: 16/138,373

(22) Filed: Sep. 21, 2018

(65) Prior Publication Data

US 2020/0097572 A1    Mar. 26, 2020

(51) Int. Cl.
*G06F 16/21*    (2019.01)
*G06F 16/22*    (2019.01)
*G06F 11/34*    (2006.01)
*G06F 16/18*    (2019.01)

(52) U.S. Cl.
CPC ............ *G06F 16/217* (2019.01); *G06F 16/22* (2019.01); *G06F 11/3476* (2013.01); *G06F 16/1815* (2019.01)

(58) Field of Classification Search
None
See application file for complete search history.

(56) References Cited

U.S. PATENT DOCUMENTS

| 7,680,795 | B2  |  3/2010 | Lashley et al. |  |
|---|---|---|---|---|
| 10,853,182 | B1* | 12/2020 | Vig ..................... | G06F 11/2023 |
| 2003/0018619 | A1* |  1/2003 | Bae ..................... | G06F 11/3476 |
| 2008/0228835 | A1* |  9/2008 | Lashley .............. | G06F 11/2097 |
| 2009/0240742 | A1* |  9/2009 | Burghard ............ | G06F 9/466 |
| 2010/0030818 | A1  |  2/2010 | Cooper et al. |  |
| 2012/0215907 | A1* |  8/2012 | Chung ................. | G06F 21/552 709/224 |
| 2014/0279920 | A1* |  9/2014 | Madhavarapu ..... | G06F 11/1458 707/649 |
| 2017/0024315 | A1* |  1/2017 | Leshinsky .......... | G06F 12/0253 |
| 2018/0144015 | A1  |  5/2018 | Mittur venkataramanappa et al. |  |
| 2018/0217888 | A1* |  8/2018 | Colgrove ............ | G06F 11/3072 |

OTHER PUBLICATIONS

Brady Upton ("Why does the transaction log grow?", Mar. 25, 2014, accessible from <https://www.mssqltips.com/sqlservertutorial/3308/why-does-the-transaction-log-grow/>) (Year: 2014).*

(Continued)

*Primary Examiner* — Matthew Ell
*Assistant Examiner* — Anugeetha Kunjithapatham
(74) *Attorney, Agent, or Firm* — Workman Nydegger

(57) ABSTRACT

Adaptive adjusting of the growth of a persistent log. The persistent log has a log record generator that adds log records to the persistent log. In addition, there are multiple log consumers that consume records from the persistent log. The log consumers publish log processing parameters with respect to the persistent log. The log processing parameters are then used to determine an appropriate adjustment in the growth of the log, which adjustments may then be executed. As an example, the log processing parameter may be a log consumption progress, in which case the log generator may be caused to slow down the generation of log records, thereby slowing the growth of the log.

20 Claims, 9 Drawing Sheets

(56) References Cited

OTHER PUBLICATIONS

Gail Shaw, "Stairway to Transaction Log Management in SQL Server, Level 7: Dealing with Excessive Log Growth", Nov. 2012, accessible from <https://www.sqlservercentral.com/steps/stairway-to-transaction-log-management-in-sql-server-level-7-dealing-with-excessive-log-growth> (Year: 2012).*

OracleGuide: "Oracle® Database Administrator's Guide", Jul. 2017, accessible from <https://docs.oracle.com/database/121/ADMIN/E41484-15.pdf> (Year: 2017).*

"NATS Streaming", Retrieved from: https://web.archive.org/web/20160710172536/https:/nats.io/documentation/streaming/nats-streaming-intro/, Jul. 10, 2016, 5 Pages.

"Redis Streams and the Unified Log", Retrieved from: https://brandur.org/redis-streams, Nov. 8, 2017, 12 Pages.

Hudis, et al., "Detecting Atiacks on Web Applications Using Server Logs", Application as Filed in U.S. Appl. No. 15/863,956, filed Jan. 7, 2018, 22 Pages.

Morgan, Andrew, "Processing Data Streams with Amazon Kinesis and MongoDB Atlas", Retrieved from: https://dzone.com/articles/processing-data-streams-with-amazon-kinesis-and-mo, Nov. 24, 2016, 33 Pages.

Narang, Savita, "Kafka as a Message Broker in the IoT World—Part 1", Retrieved from: https://wiprodigital.com/2016/04/05/kafka-as-a-message-broker-in-the-iot-world-part-1/, Apr. 5, 2016, 13 Pages.

Selbert, Parker, "Kafka, Logs, and the Policy of Truth", Retrieved from: https://blog.codeship.com/kafka-logs-and-the-policy-of-truth/, Feb. 9, 2016, 6 Pages.

\* cited by examiner

ADJUSTING GROWTH OF PERSISTENT LOG

BACKGROUND

A variety of services are now offered in a cloud computing environment. "Cloud computing" is a model for enabling ubiquitous, on-demand network access to a shared pool of configurable computing resources (e.g., networks, servers, storage, applications, and services). A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. One type of software as a service ("SaaS") is known as database as a service (DBaaS).

Conventional DBaaS is typically implemented within an architecture that includes one primary compute node and one or more secondary compute nodes (each node often provided as a virtual machine). The primary compute node operates a database server and has a directly attached solid state drive that the primary database server may read from and write to. Secondary compute nodes also operate the database server and also have a solid-state drive that the respective secondary database server may read from and write to. The data on the primary compute node is synchronized with the secondary compute nodes.

The secondary compute nodes provide redundancy with the aim of meeting service availability objectives. If the primary compute node was to fail, failover of the database may occur by promoting one of the secondary compute nodes to the primary compute node, and instantiating an additional secondary compute node to maintain the desired level of redundancy.

In order to synchronize the data at the primary compute node with the data at the secondary compute nodes, communication is required from the primary compute node to the secondary compute nodes. The primary compute node keeps a log of operations that occur at the primary compute node. The primary compute node may send the log records (either individually or as a block) to the secondary computing nodes. The secondary compute nodes each apply the operations specified by the primary compute node, and acknowledges such back to the primary compute node. Once the primary compute node receives such an acknowledgement back from a quorum (say two out of three secondary compute nodes), the primary compute node has synchronized its data with the secondary compute nodes to a degree that if the primary compute node goes down, there is a guaranty that a majority of the secondary compute systems will have the log record applied. Thus, in case of recovery, even if the newly elevated primary compute node had not yet applied the log record, that newly elevated primary compute node may still update itself with the current data by consulting with the other secondary compute nodes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the adaptive adjusting of the growth of a persistent log. The persistent log has at least one log record generator that adds log records to the persistent log. In addition, there are multiple log consumers that consume records from the persistent log. As an example only, the log record generator may be a primary compute system, and the log consumers may be secondary compute systems that apply log records with the aim towards mirroring state performed by the primary computing system. That way, one of the secondary compute systems may be promoted to primary should the primary compute system fail. The adaptive adjusting of the growth of the persistent log may be performed independent (e.g., as a service) from the primary compute system. Thus, even if the primary compute system was to fail, appropriate adjustments of the growth of the log may still be reliably performed.

The log consumers publish one or more log processing parameters with respect to the persistent log. The log processing parameters are then used to determine an appropriate adjustment in the growth of the log, which adjustments may then be executed. As an example, the log processing parameter may be a log consumption progress, in which case the log generator may be caused to slow down the generation of log records, thereby slowing the growth of the log. This prevents any of the log consumers from being too far behind the log generator, thereby allowing the collective system to act more as a cohesive group. For instance, the secondary compute systems may be brought much closer to the state of the primary compute system. This is helpful should one of the secondary compute systems be promoted to primary. Furthermore, the log may be prevented from growing too large due to a need to accommodate log consumers who are consuming the log at vastly different points.

As another example, the growth of the log may be controlled by reclaiming old log records (e.g., old log sub-portions or virtual log files) based on published parameters from the log consumers. Thus, storage space is more efficiently used, even in the context of a log that constantly has new log records added to it.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

Figure 1:
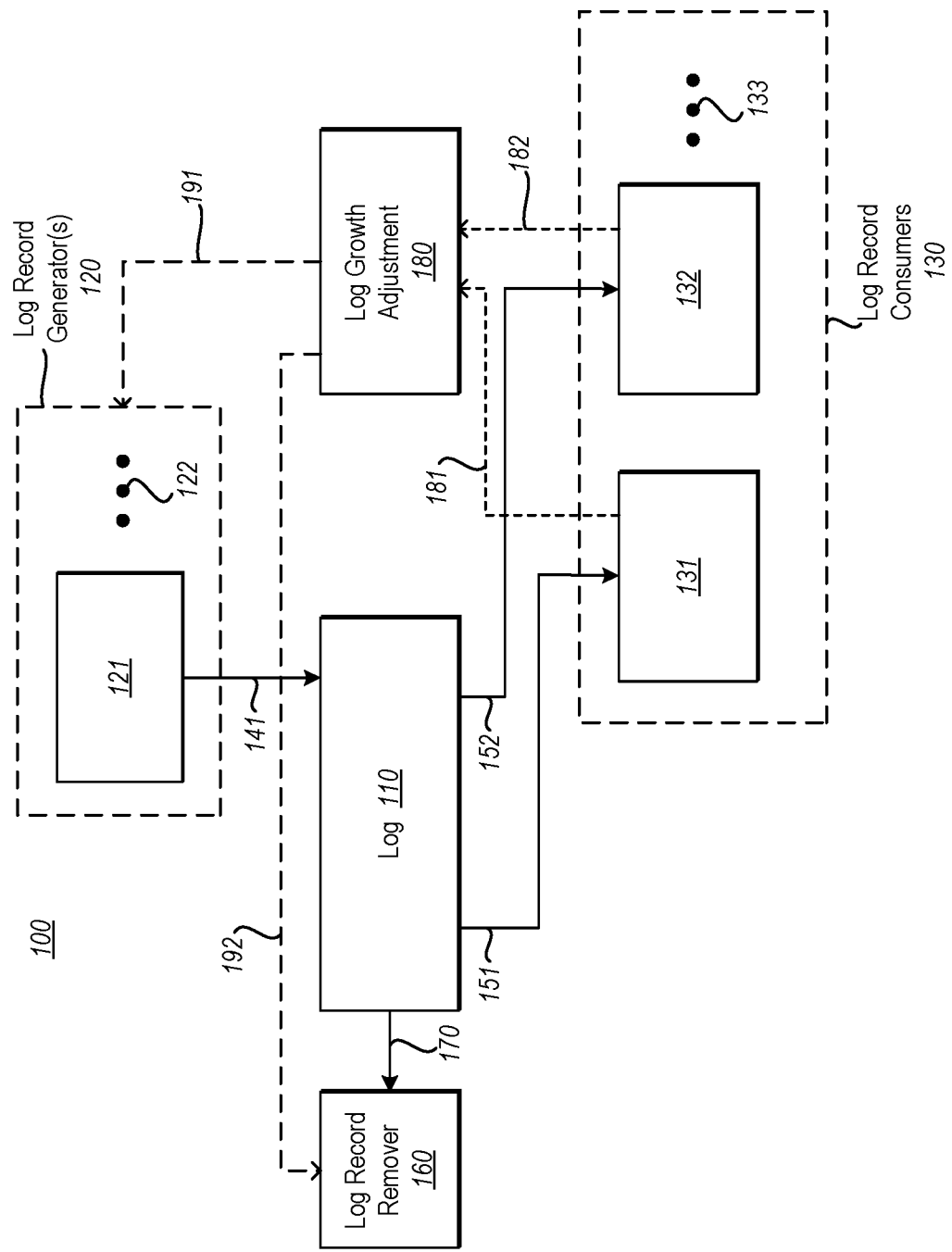
FIG. 1 illustrates an example log environment 100 in which the principles described herein may be employed.

At least some embodiments described herein relate to the adaptive adjusting of the growth of a persistent log. FIG. 1 illustrates an example log environment 100 in which the principles described herein may be employed. The log environment 100 includes a log 110, log record generator(s) 120 that are adding log records to the log 110, and log consumers 130 that read log records from the log 110.

The log 110 may be a persistent log that is persisted independent of the state of the log record generator(s) 120. That is, all of the log record generator(s) 120 could fail or undergo a power cycle, and the log 110 would remain with its content intact. As an example, the log 110 may be a log maintained by a service, such as a cloud computing service.

The log record generator(s) 120 is illustrated as including a single log record generator 121. However, the ellipsis 122 represents that the principles described herein may apply regardless of how many computing systems are adding new log records to the log 110. The log record generator 121 adds new log records to the log as represented by the arrow 141. The log consumers 130 are illustrate as including two log consumers 131 and 132. However, the ellipsis 133 represents that there may be any number of log consumers 130 that read log records from the log 110. The arrows 151 and 152 represent the log consumers 131 and 132, respectively, reading from the log 110. Note that the log consumers 131 and 132 are reading from different portions of the log 110. An optional log record remover 160 is also illustrated as removing (as represented by arrow 170) the older log records from the log 110.

As an example only, the log record generator 121 may be a primary compute system, and the log record consumers 130 may each be secondary compute systems that apply log records with the aim towards mirroring state performed by the primary computing system. That way, one of the secondary compute systems may be promoted to primary should the primary compute system fail. The adaptive adjusting of the growth of the persistent log may be performed independent (e.g., as a service) from the primary compute system. Thus, even if the primary compute system was to fail, appropriate adjustments of the growth of the log may still be reliably performed. Alternatively, or in addition, the log consumers 130 may be a storage segment server and/or a log destagers. Such terms will be more understood based on the description of an example environment described with respect to FIGS. 3 to 9.

Figure 2:
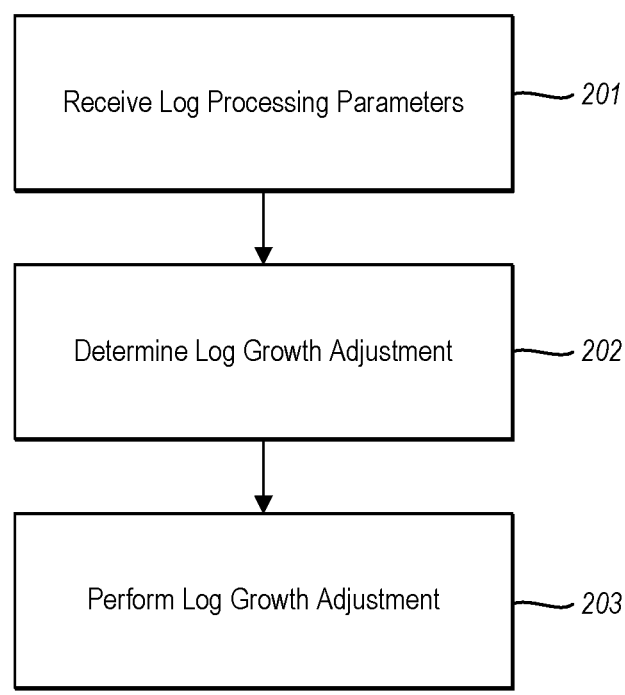
FIG. 2 illustrates a method 200 for making adjustments in the growth of a persistent log in accordance with the principles described herein.

FIG. 2 illustrates a method 200 for making adjustments in the growth of a persistent log in accordance with the principles described herein. The method 200 includes receiving log processing parameters from each of multiple log consumers (act 201). For instance, in FIG. 1, a log growth adjustment component 180 may receive (as represented by dotted-lined arrows 181 and 182) log processing parameters from each of the log consumers 131 and 132. The log growth adjustment component may use received log processing parameters (along with potentially other information) to determine an adjustment in the growth of the log (act 202). Then, the determined appropriate log growth adjustment may be made to the log (act 203).

The log growth adjustment component 180 may be a physical computing system (such as a compute node in a cloud computing environment), in which case the log growth adjustment component 180 may be structured as described below with respect to the computing system 1000 of FIG. 10 below. Alternatively, or in addition, the log growth adjustment component 180 may be a virtual machine that emulates a computing system. Alternatively, or in addition, the log growth adjustment component 180 may be an executable component, such as the executable component 1006 described below with respect to FIG. 10.

For instance, in FIG. 1, the log growth adjustment component 180 may determine an appropriate log growth adjustment to make based on the communications 181 and 182 from the log consumers 130. Furthermore, the log growth adjustment component 180 may make the adjustment by adjusting (as represented by dashed-lined arrow 191) one or more of the log generator(s) 120 (e.g., to speed up or slow down the rate that new log records are added to the log).

As an example, the log processing parameter may be a log consumption progress, in which case the log generator may be caused to slow down the generation of log records, thereby slowing the growth of the log. This prevents any of the log consumers from being too far behind the log generator, thereby allowing the collective system to act more as a cohesive group. For instance, the secondary compute systems may be brought much closer to the state of the primary compute system. This is helpful should one of the secondary compute systems be promoted to primary. Furthermore, the log may be prevented from growing too large due to a need to accommodate log consumers who are consuming the log at vastly different points.

Alternatively, or in addition, the log growth adjustment component 180 may make the adjustment by adjusting (as represented by dashed-lined arrow 192) the log record removers 160 (e.g., to reclaim storage associated with old log records of the log). As another example, the growth of the log may be controlled by reclaiming old log records (e.g., old log sub-portions or virtual log files) based on published parameters from the log consumers. Thus, storage space is more efficiently used, even in the context of a log that constantly has new log records added to it.

As another example, the log growth adjustment component 180 may receive a parameter for storage segments (e.g., pages) as well. For instance, the log growth component 180 may receive notification from the log record consumers 130 of the earliest page version needed for each page. This would allow the log growth adjustment component 180 to allow for cleanup and reuse of storage associated with older versions for each page.

Figure 3:
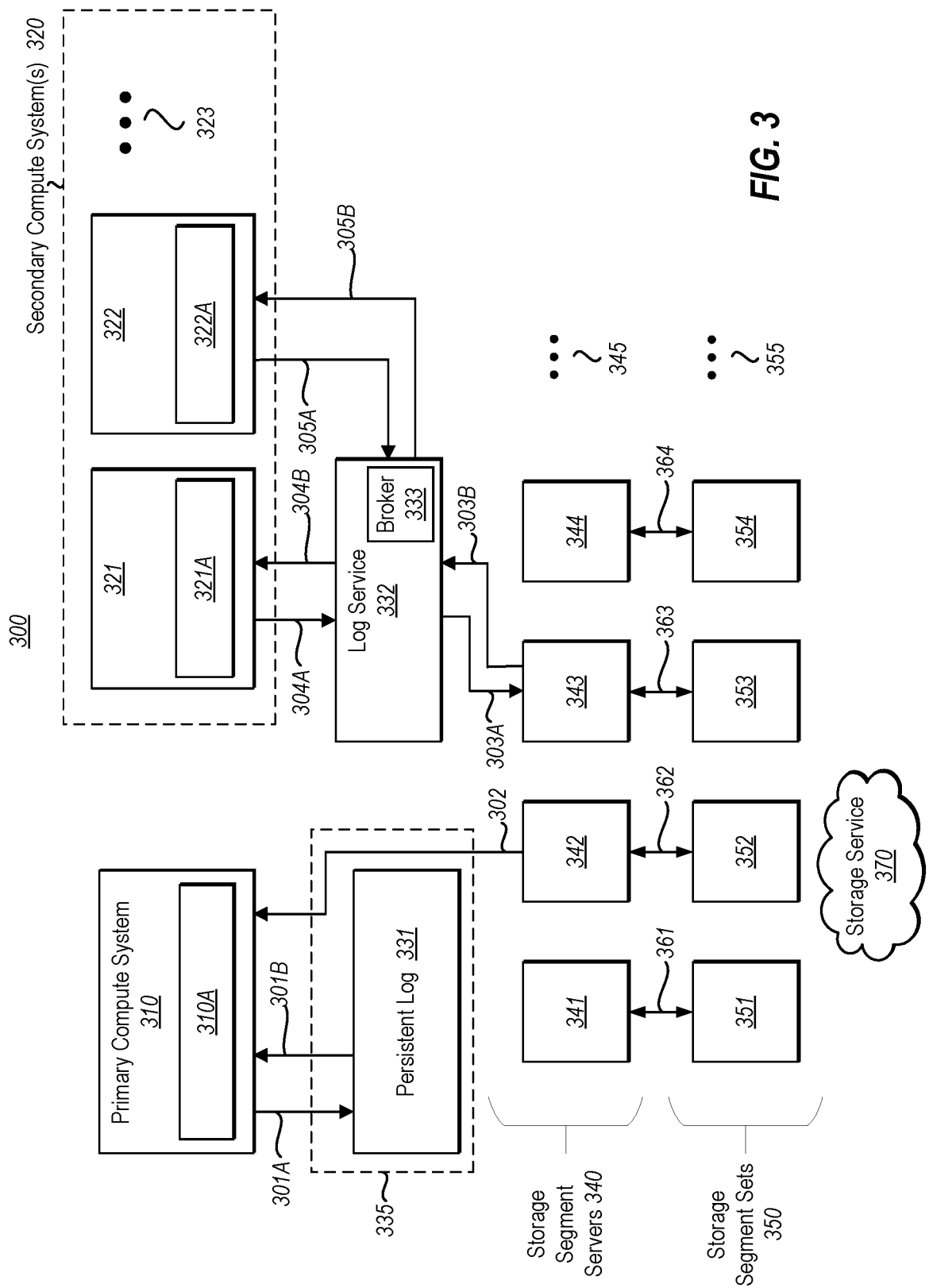
FIG. 3 illustrates an environment in which the principles described herein may be employed, which includes a primary compute system, one or more secondary compute systems, storage segment servers across which data is stored, a persistent log, and a log service for applying log records generated by the primary compute system.

FIG. 3 illustrates an environment 300 in which the principles described herein may be employed. As an example only, the environment 300 may be a network, such as perhaps a cloud computing environment. The environment 300 includes a primary compute system 310 that operates thereon an application 310A. As an example, the application 310A may be a database server application. The primary compute system 310 may be a physical computing system (such as a compute node in a cloud computing environment), in which case the primary compute system 310 may be structured as described below with respect to the computing system 1000 of FIG. 10 below.

Alternatively, or in addition, the primary compute system 310 may be a virtual machine that emulates a computing system. The application 310A running on the primary compute system 310 performs write operations against user data. For instance, if the application 310A is a database server, the user data would be the database. The primary compute system 310 is an example of the log record generator 121 of FIG. 1.

The environment 300 also includes secondary compute systems(s) 320. Each of the secondary compute system(s) 320 operates a corresponding application, which may be an instance of the very same application that is being run on the primary compute system 310. For instance, if the application 310A on the primary compute system 310 was a database server application, an instance of the database server application may be run on each of the secondary compute system(s) 320. The secondary compute system(s) 320 may each be a physical computing system (such as a compute node in a cloud computing environment), in which case the secondary compute system may be structured as described below with respect to the computing system 1000 of FIG. 10. Alternatively, or in addition, each secondary compute system(s) 320 may be a virtual machine that emulates a computing system. The secondary compute system(s) 320 are ach examples of the log record consumers 130 of FIG. 1.

The secondary compute system(s) 320 may include any number of secondary compute systems. In the illustrated embodiment, there are two secondary compute systems 321 and 322 illustrated, each operating a respective application 321A and 322A. The ellipsis 323 represents that the principles described herein are not limited to the number of secondary compute system(s) 320. Should the primary compute system 310 fail such that recovery is not efficiently possible, one of the secondary compute system(s) 320 would be promoted to be the new primary compute system, thus allowing that promoted compute system to perform write operations. Thus, the secondary compute system(s) 320 allows for there to be built-in redundancy within the environment 300. If a secondary compute system is promoted to be the primary compute system, a new secondary compute system may be started in order to replace the promoted compute system and thereby retain a desired number of secondary compute system(s) 320. On the other hand, secondary compute systems may be added or removed from the set of secondary compute system(s) at will independent of whether the primary compute system 310 has failed.

When the primary compute system 310 performs write operations to user data (e.g., a database), the primary compute system 310 logs (as represented by arrow 301A) those data operations into a persistent log 331. The persistent log 331 is kept so that the environment 300 may recover in case of a failure. The process of the primary compute system 310 writing to a storage segment (e.g., a page of user data), while persistently logging that write operation, will now be described. The persistent log 331 is an example of the log 110 of FIG. 1.

Figure 4:
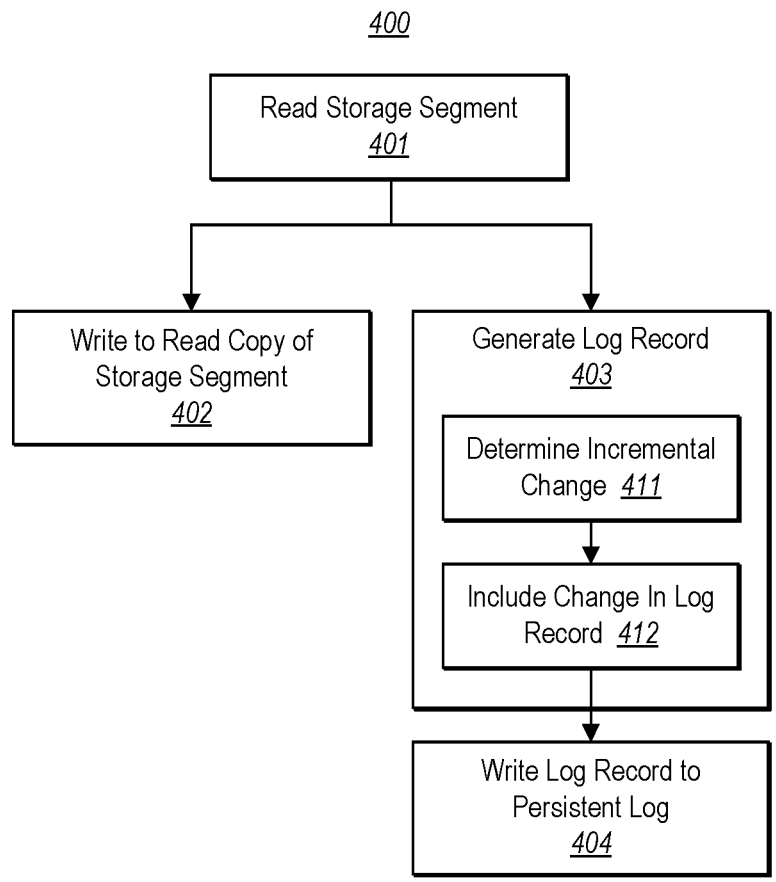
FIG. 4 illustrates a flowchart of a method for generating a log record and performing a write operation.

In particular, FIG. 4 illustrates a flowchart of a method 400 for generating a log record and performing a write operation. As an example, the method 400 may be performed by the primary compute system 310 of FIG. 3. The primary compute system first reads a particular storage segment (act 401). This ensures that a copy of the storage segment is brought into the cache of the primary compute system. The storage segment may have been previously read by the primary compute system, in which case that storage segment will already be within the cache of the primary compute system. Otherwise, the primary compute system performs a read operation from the respective storage segment server that contains the storage segment that is to be written to. In FIG. 3, for instance, the primary compute system 310 reads (as represented by arrow 302) a storage segment (e.g., a page) from the storage segment server 342).

Figure 5:
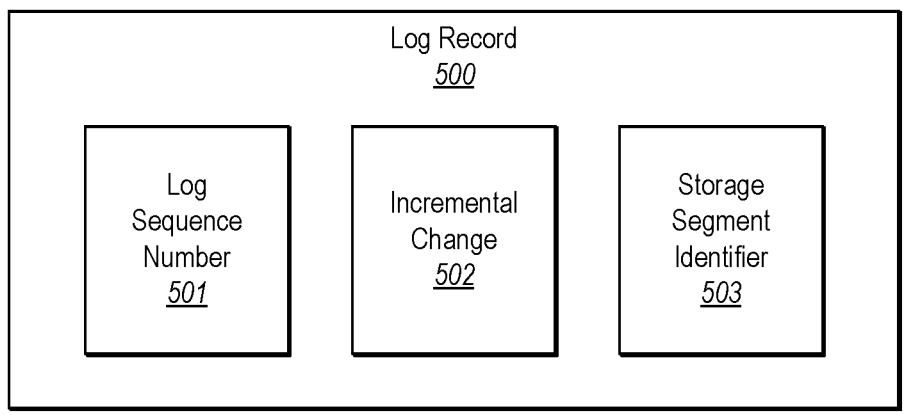
FIG. 5 illustrates a log record that includes a log sequence number, a description of the incremental change to a storage segment, as well as the storage segment identifier to which that change was applied.

The primary compute system then writes to the read (e.g., cached) copy of that storage segment (act 402). Also, to create a log record of that write operation (act 403), the incremental change made or to be made as part of that write operation is determined (act 411). The primary compute system then creates a log record that includes the incremental change (act 412). For instance, FIG. 5 illustrates a log record 500 that includes a log sequence number 501, description of the incremental change 502, as well as the storage segment identifier 503 to which that change was applied. A log sequence number is a number that uniquely identifies a log record, and that represents a position of the log record within the log. The log sequence number is typically a monotonically increasing number such that the higher the log sequence number, the more recent the log record was placed within the log. The log record is written in a persistent log (act 404). For instance, as represented by arrow 301A, the primary compute system 310 writes the log record (e.g., log record 500) into the persistent log 331.

This writing of a log record to the log is also an example of the log record writing represented by arrow 141 in FIG. 1. Referring to FIG. 1, the rate of writing of new log records to the log (as represented by arrow 141) may be adjusted by the log growth adjustment component 180 in response to signals from the log record consumers regarding their log consumption progress. This will allow the slower of the log record consumers 130 to at least partially catch up, causing the system 100 to act more as a cohesive unit.

Figure 6:
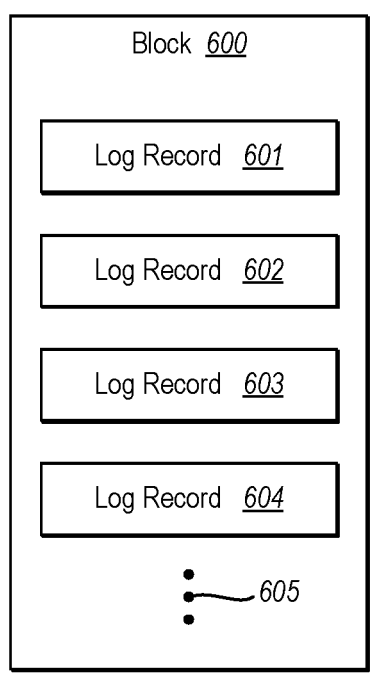
FIG. 6 illustrates a block populated with multiple log records.

In one embodiment, the log records are organized into blocks. A block is a unit of storage that may be written to and read from atomically (i.e., at one time such that the write or read is either completed for the entire block, or not completed at all). A typical block size will be constant in a computing system, but example block sizes include 512 and 4096 bytes. Because a log record may be much smaller than a block, a block may include multiple log records. FIG. 6 illustrates a block 600 populated with multiple log records 601, 602, 603 and 604. As an example, the log record 500 of FIG. 5 might be the log record 602 of FIG. 6. The ellipsis 605 represents that the block 600 may include any number of blocks that are suitable given the size of a log record, and the size of the block. Each log record may be said to occupy a "slot" within the block. When writing the log record to the persistent log (as represented by arrow 141 of FIG. 1, arrow 301A of FIG. 3 and act 404 of FIG. 4), it may be a block of log records (such as block 600) that is written to the persistent log. Thus, the primary compute system 310 may wait for some number of log records to be generated before writing the log records as a block to the persistent log 331.

Returning to FIG. 3, the environment 300 also include a log service computing system 332. The log service computing system 332 may be a physical computing system, such as the computing system 1000 described below with respect to FIG. 10. Alternatively, or in addition, the log service computing system 332 may be a virtual machine, or perhaps may be an executable component, such as the executable component 1006 described below with respect to FIG. 10. The log service computing system 332 helps write operations that are performed and logged by the primary computing system 310 to be propagated to the appropriate storage segment server 340, and to the secondary compute system(s) 320. In one embodiment, the log growth adjustment component 180 of FIG. 1 is incorporated into the log server computing system 332.

The environment 300 also includes multiple storage segment servers 340. The data operated upon by the application 310A on the primary compute system 310 is spread across the storage segment servers 340. Each storage segment server is thus for servicing storage segments corresponding to only a portion of the user data. Storage segments may, for instance, be pages of data. Each page of data may include multiple blocks. Each of the storage segment servers 340 may be an example of the log record consumers 130 of FIG. 1.

For instance, as represented by arrow 361, storage segment server 341 performs data operations for only the assigned storage segment set 351. Furthermore, arrow 362 represents that storage segment server 342 performs data operations only for its assigned storage segment set 352, arrow 363 represents that storage segment server 343 performs data operations for only its assigned storage segment set 353, and arrow 364 represents that storage segment server 344 performs data operations for only its assigned the storage segment set 354. The ellipses 345 and 355 represent that the principles described herein are not limited to the number of storage segment servers. Furthermore, the storage segment set assigned to any given storage segment server need not be contiguous storage segments within an address space.

However, identifying which storage segment server is assigned to perform data operations for a given storage segment is simpler if the storage segments (e.g., pages) assigned to any given storage segment are contiguous within the address space of the user data. Furthermore, read operations on continuous storage segments may be more efficiently performed since a single read operation may be issued to return potentially many contiguous storage segments. In one embodiment, the user data is represented within a storage service 370 that underlies the storage segment servers 340. The user data distributed across the storage segment servers 340 may maintain the same layout and structure as the user data on the storage service 370.

The storage segment sets 351 through 355 are illustrated collectively as storage segment sets 350. When the storage segment servers 340 store their respective data using the storage service 370 offered by a cloud computing environment, the need to perform size of data operations is eliminated. For instance, such size of data operations may be the performance of a full backup of the entirety of the data. Conventionally, the primary compute system and each of the secondary compute systems would have to perform a full backup separately, by transferring data over a network. Thus, the principles described herein allow for excellent capability to scale the data upwards. However, a copy of the storage segment sets 351 through 355 may also be kept in a cache at each of the respective storage segment servers 341 through 345. This allows for rapid access to the storage segments. But if the storage segment is lost in the cache of the storage segment servers 340 (or even if one of the storage segment servers itself goes down), the storage segment is still available in the storage service 370 in the cloud computing environment.

Figure 7:
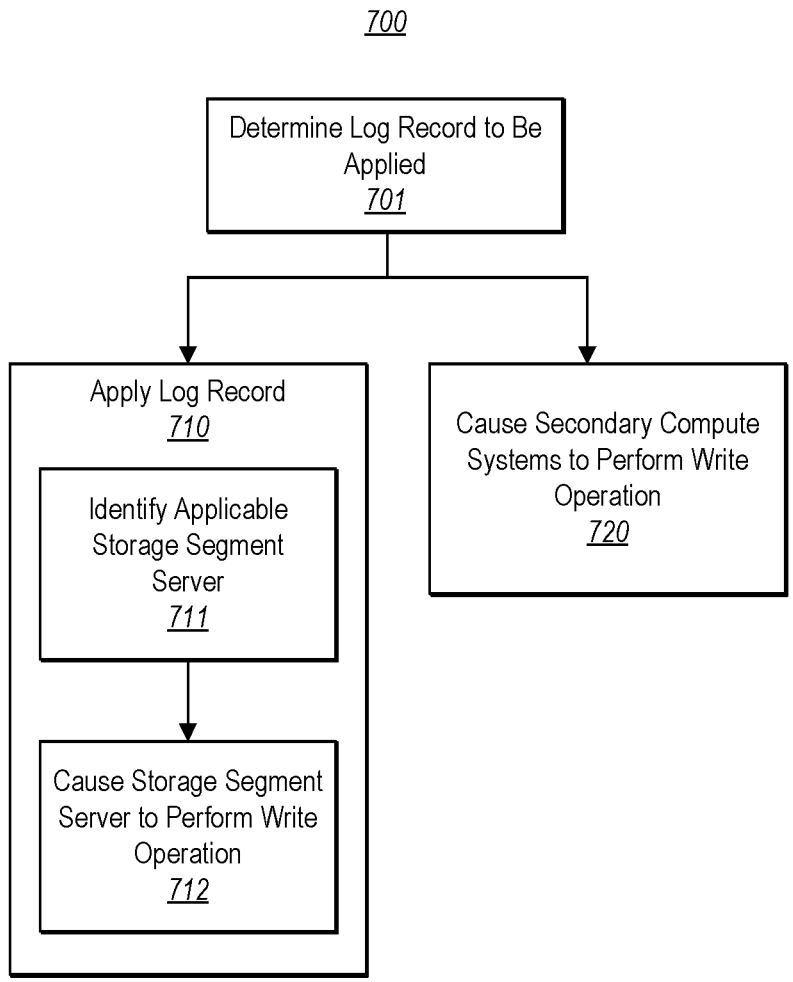
FIG. 7 illustrates a flowchart of a method for applying a log record to storage segments in accordance with the principles described herein.

FIG. 7 illustrates a flowchart of a method 700 for applying a log record to storage segments in accordance with the principles described herein. The method 700 may be performed for each of multiple log records that are identified as to be applied. Thus, the performance of method 700 many times allows the log to be applied to appropriate storage segments. That is the write operations specified in the log records are applied to the storage segments within the appropriate storage segment servers. As an example, the method 700 may be performed by the log service computing system 332 of FIG. 3. The method 700 may be performed within the environment 300 of FIG. 3, in order to apply the log record 500 of FIG. 5. Accordingly, FIG. 7 will now be described with respect to the FIGS. 3 and 5.

The method 700 is initiated upon determining that a particular log record is to be applied (act 701). For instance, that particular log record may be the log record 500 of FIG. 5. In response to identifying that the particular log record is to be applied, the particular log record is applied (act 710). This may be done with respect to the particular storage segment server that corresponds to the storage segment. This may also be done with respect to each secondary compute system.

Accordingly, the applying of the log record (act 710) includes identifying a particular storage segment server that is assigned to a particular set of storage segments that includes the particular storage segment to be written to in the particular write operation (act 711). In the case in which the set of storage segments are contiguous in an address space, the assignment of the set of storage segments to each storage segment server may be made to align with the most significant bits of the storage segment identifier. For instance, suppose that the storage segment identifiers range from binary 00000,00000 (comma added every five bits to assist the reader) to binary 01101,01111. In that case, there might be seven storage segment servers, one for storage segments having identifiers with the four most significant bits being 0000, another for the storage segments having identifiers with the four most significant four bits being 0001, and so on, until the seventh storage segment for storage segments having identifiers with the four most significant bits being 0110. Thus, determining which storage segment server is assigned to store a particular storage segment becomes an efficient computation. The log service computing system 332 may thus determine the appropriate storage segment server for the log record 500 based on the storage segment identifier 503.

Then, the particular storage segment server is caused to perform the particular write operation to the particular storage segment designated in the particular log record (act 712). For instance, the log service computing system 332 may provide (e.g., as represented by arrow 303B) the log record 500 to the appropriate storage segment server (say storage segment server 342). This would represent the completion of the write operation that begin when the primary compute system 310 read (as represented by the arrow 302) that storage segment from the storage segment server. Note that the providing of a log record to the appropriate storage segment server is an example of the arrows 151 and 152 of FIG. 1. This demonstrates that the providing of a log record to the log record consumer 130 may be performed by a log service computing system 332. That is the arrows 151 and 152 merely symbolically represent that the log records are provided to the log record consumers 130 after the log records are confirmed to have been persisted in the log.

In one example, this notification (represented by arrow 303B) is not pushed to the appropriate storage segment server. Instead, it is up to the storage segment server to make inquiry of the log service computing system 332 for the appropriate log records. Thus, the providing of the appropriate log record to the storage segment server may be in response to the request from the particular storage segment server. Thus, the storage segment server 342 assigned to the storage segment written to may be notified of the write operation after the storage segment server 342 asks for applicable log entries (as represented by arrow 303A).

The log service computing system 332 may have a broker component 333 thereon that handles processing of incoming requests for log records. The broker 333 may be an executable component on the log service computing system. For instance, the broker 133 may be structured as described below for the executable component 1006 of FIG. 10. The broker 333 may provide log records not one at a time, but perhaps one block at a time. For instance, if the broker 333 determines that there are any log records (e.g., any of log records 601, 602, 603, 604 or 605) within a block of log records (e.g., block 600) that have a storage segment identifier within the set of storage segments assigned to a particular storage segment server, the broker 333 may send the entire block to the particular storage segment server.

In addition, the broker 333 may ensure that the log record is not communicated to any entity until the log service computing system 332 has been notified that the log record has been securely written into the persistent log 331 (i.e., the log record has become public). This helps the recovery process be consistent. During recovery, the recovery uses the persistent log 331 to determine what operations have been completed. If other components in the system (e.g., a secondary compute system or a storage segment server) has performed operations that the persistent log 331 is not aware of, then the recovery will fail to achieve a reliable state. The user data then becomes ambiguous, and thus corrupt.

The broker 333 may also perform other tasks. For instance, the broker 333 may expect that the primary compute system 310 (which is the source of the generated log records) is unreliable. In order to compensate for that, the broker 333 may implement different policies for deduplicating log records that have been received multiple times from the primary compute system 310. The broker 333 may perform this deduplication by keeping track of the primary compute system generations and by retaining only the latest generation for all log records. The broker 333 may also expect log records to get lost and compensates for that by filling in log records that were missed (e.g., by reading from the fixed-size log portion 901) described below.

Returning to the method 700 of FIG. 7, the log service computing system also causes a secondary compute system to perform the particular write operation on a copy of the storage segment at the secondary compute system (act 720). This may also be performed by communicating (as represented by arrows 304B and 305B in FIG. 3) the log record (e.g., log record 500) to each secondary compute systems 321 and 322. While the log record may be pushed to the secondary compute systems 320, the broker 333 may likewise handle requests for log records (as represented by arrows 304A and 305A) from the secondary compute systems 320. Again, the log records may be provided as a block. As a reminder, the broker 333 may ensure that log records are not communicated to the secondary compute systems 320 unless the log record is already confirmed as having being written to the persistent log 331.

Figure 8:
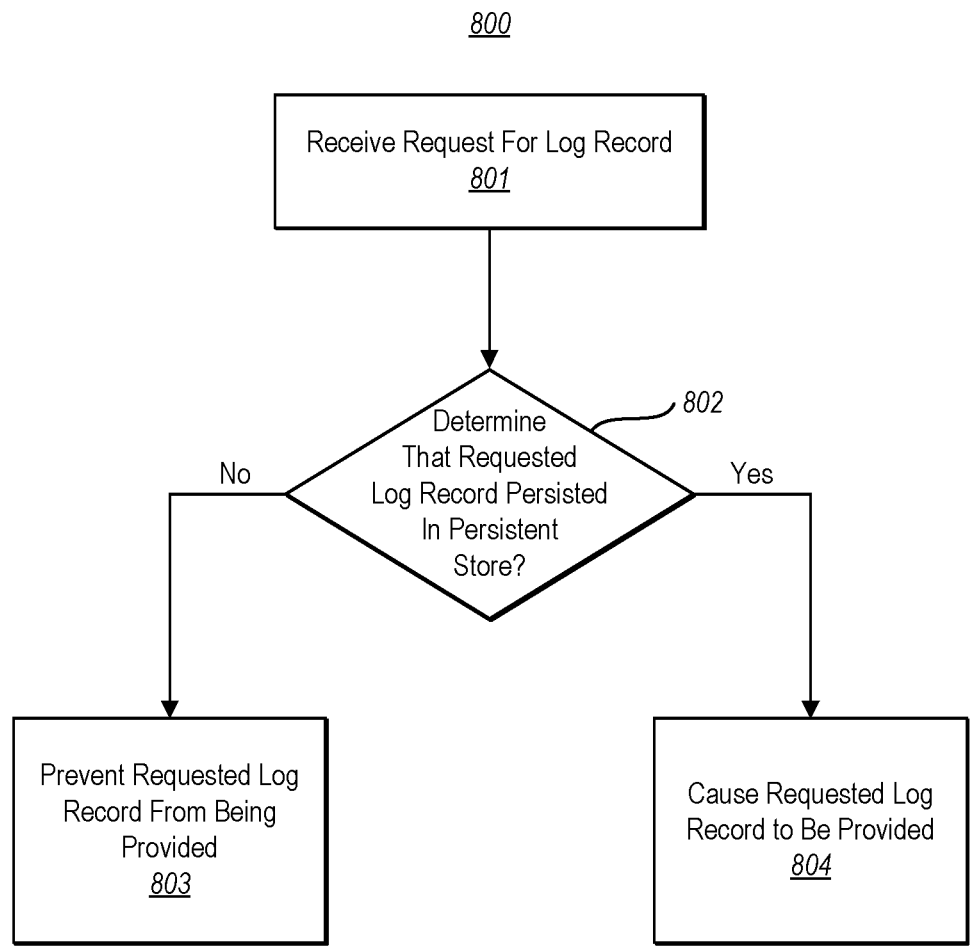
FIG. 8 illustrates a flowchart of a method for a broker component brokering log records in accordance with the principles described herein.

FIG. 8 illustrates a flowchart of a method 800 for a broker component brokering log records. The method 800 may be performed by, for instance, the broker 333 of FIG. 3. The method 800 is initiated upon receiving a request for a log record from a requesting entity (act 801). In FIG. 3, for instance, any of the storage segment servers 340 may be the requesting entity. Arrow 303A represents a request for a log record in the case of the storage segment server 343 being the requesting entity. In addition, any of the secondary compute systems 320 may be the requesting entity. Arrow 304A represents a request for a log record in the case of the secondary compute system 321 being the requesting entity. Arrow 305A represents a request for a log record in the case of the secondary compute system 322 being the requesting entity.

In response to this request, the broker component then determines whether the requested log record has been persisted in a persistent log (decision block 802). For instance, in FIG. 3, the broker determines whether the log request has been persisted in the persistent log 331. If the broker does not determine that the requested log record has been persisted in the persistent log ("No" in decision block 802), then the log record either has not yet been persisted in the persistent log, or even if the log record has been persisted in the persistent log, the broker component has not yet been notified of that. In that case ("No" in decision block 802), the broker component prevents the requested log record from being provided to the requesting entity for at least so long as the broker component cannot confirm that the log record has been persisted in the persistent log (act 803). If the log record is not determined to have been persisted in the persistent log, the broker component may cause the log record to be provided to the requesting entity after the broker component later confirms that the log record has been persisted in the persistent log.

On the other hand, if the broker component determines that the requested log record has been persisted in the persistent log ("Yes" in decision block 802), the broker component responds to the request for the log record by causing the requested log record to be provided the requesting entity (act 804). For instance, in FIG. 3, arrow 303B represents the broker 333 causing a log record to be provided to the storage segment server 343 in response to request 303A. Arrow 304B represents the broker 333 causing a log record to be provided to the secondary compute system 321 in response to request 304A. Arrow 305B represents the broker 333 causing a log record to be provided to the secondary compute system 322 in response to request 305A. Once they access the requested log record, the appropriate storage segment server and/or any of the secondary compute systems may then perform the data operation specified in the log record.

In the case of the log record being written to the persistent log one block at a time (e.g., within block 600), the broker may provide log records one block at a time to the requesting entities (i.e., to the appropriate storage segment server, and/or to the secondary compute systems). In that case, the determination of whether the log record has been persisted within the persistent log may simply be a determination of whether the block that contains the log record has been persisted within the persistent log. The primary compute system 310 may notify the log service computing system 332 whenever the primary compute system 310 receives confirmation that it has successfully written a block of log records into the persistent log 331. In this case, the request for a log record may be a request for a block of log records.

In one embodiment, prior to providing a requested log record to a storage segment server, the broker first determines that the log record represents an operation performed on a storage segment that is within the set of storage segments assigned to the requesting storage segment server. If providing log records one block at a time, then the broker may provide the block of records to the storage segment server after first determining that the block of records contains a least one log record for an operation performed on a storage segment of a set of storage segments assigned to the particular storage segment server.

The persistent log 331 may be stored within a volume 335 that is within the storage service 370 in a cloud computing environment. That storage service 370 would ensure that the log records (e.g., each log record block) is redundantly saved prior to providing confirmation back to the primary compute system 310 that the log record block has been written. Once the storage service 370 ensures that a proper minimum number of copies of the log have been written to in the volume 335, the storage service 370 acknowledges the write as having been completed. The persistent log 331 may then immediately acknowledge (as represented by the arrow 301B) back to the primary compute system 310 that the write has completed, allowing the primary compute system 310 to continue performing operations that depend on that completion.

The volume 335 may be mounted to multiple computing systems. For instance, that single mounted volume 335 may be included within a drive that is mounted to the primary compute system 310 as a read and write volume, while being mounted to the secondary compute system(s) 320 as a read-only volume. Since there is only one computing system mounted to that volume as a write volume, multiple computing systems may be mounted to the volume 335 without risk of corruption of data due to competing or inconsistent write operations. The volume might be within a cloud computing environment as part of a cloud store service. For instance, rather than read log records from the broker 333, the storage segment servers 340 and/or the secondary compute systems may read log records directly from the persistent log 333.

In some embodiments, the storage segment sets 350 may be managed by a cloud service in a cloud computing environment. In that case, the cloud service may itself ensure that a minimum number (or a quorum) of redundant copies of the storage segment is stored within the cloud storage prior to the write operation being considered successful. The quorum is established such that in case of failure, the quorum of redundant copies of the storage segment allows for a definitive determination on what the content of the storage segment is. Thus, when the storage segment server acknowledges completion of the write operation, the write operation has already been executed onto a least a quorum of storage locations. Since the secondary compute systems are no longer responsible for maintaining the quorum, the number of secondary compute systems is highly flexible. Instead, secondary compute systems are used more often to allow for local secondary compute systems to be available for processing, and also to account for failover, and not to ensure durability of the storage itself.

Accordingly, the principles described herein describe an architecture in which the data is separated from the primary and secondary compute systems. Because a relatively smaller amount of data is actually cached by the secondary compute system, it becomes relatively quick to build a new secondary compute system. The cache of the secondary compute system may be empty, which would just mean it might take a little longer for some of the initial read operations. For instance, a new secondary compute system may be established when further redundancy is wanted in order to increase levels of availability. Alternatively, a new secondary compute system may be established to replace a just-promoted secondary compute system that is now acting as the primary compute system, in order to maintain a current level of availability.

The time taken to build a new secondary compute system is reduced significantly since a new secondary compute system no longer needs to have a directly attached volume with an entire replica of the data. Instead, the secondary compute system only may need the application, and a relatively small cache. Furthermore, the establishment of a quorum for purposes of determining whether a log record has been properly entered into the log may now be handled by a storage service, in cases in which the primary compute system writes to a volume attached into that storage service. In such cases, the write to the log only completes once the storage service has already established that the log record has been durably written to an appropriate number of locations.

Having described the principles of the environment 300 with respect to FIGS. 3 through 8, more regarding the log within the volume 335 will now be described with respect to FIG. 9. Recall that the volume 335 is a write volume for the primary compute system 310, but a read-only volume for the secondary compute system(s) 320. This is possible because only the primary compute system 310 writes to the log within the volume 335, whereas the secondary compute system(s) 320 only reads from the persistent log 331 within the volume 335. There is herein described a refinement on how an infinite log (one that may grow within limit) may be accommodated based on the volume 335, while allowing all of the entities that read from the log to know what address to read from within the log.

Figure 9:
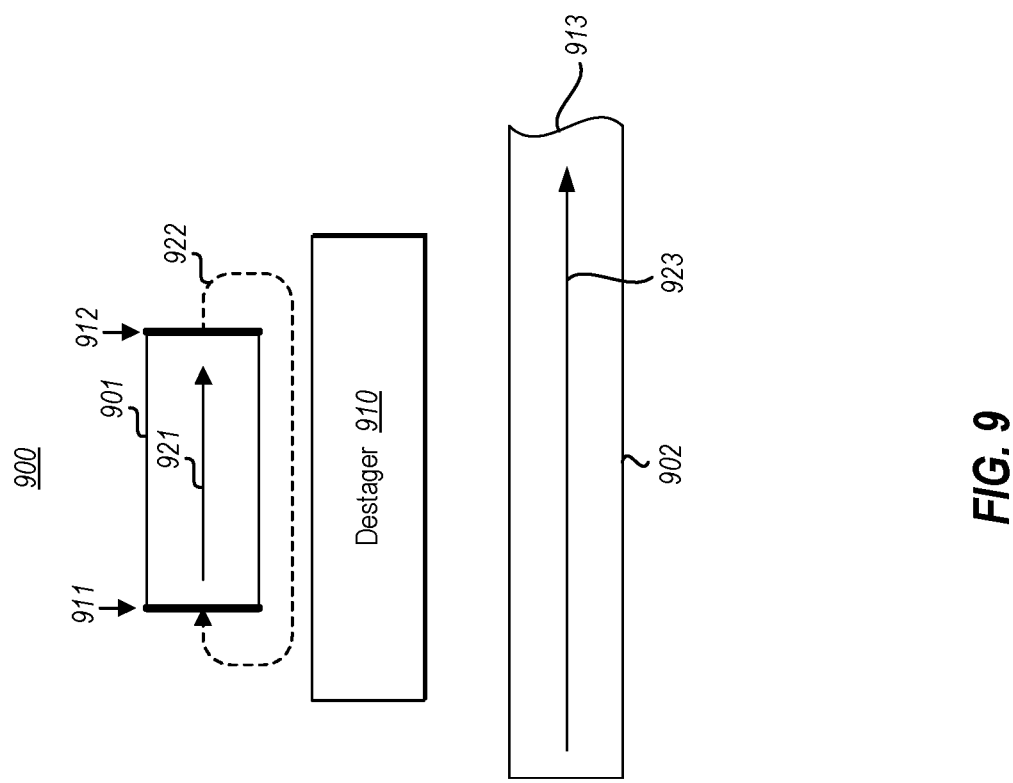
FIG. 9 illustrates a log environment in which the log is composed of two components—a fixed-size log portion and a growable log portion.

FIG. 9 illustrates a log environment 900 in which there is a log that is composed of two components—a fixed-size log portion 901 and a growable log portion 902. The fixed-size log portion is fixed in size as symbolically represented by the boundaries 911 and 912 being thicker. The fixed-size log portion 901 includes the more recent log records recorded in the log (and includes the tail of the log). An advantage of the fixed-size log portion 901 being fixed in size is that readers of the fixed-size log portion 901 are able to deterministically know where a log record is located within the fixed-size log portion 901 using only the log sequence number of that log record. This simplifies the process of enabling readers to read log records from the log.

The fixed-size log portion 901 is sequentially written to as represented by the arrow 921. When the end (e.g., end 912) of the fixed-size log portion 901 is encountered, the writing wraps back (as represented by dashed-lined arrow 922) to the beginning (e.g., beginning 911) of the fixed-size log portion 901 to continue writing to the log. Thus, the writing to the fixed-size log portion 901 occurs in circular fashion. Because of the circular write pattern, older log records will be overwritten by newer log records. Prior to that happening, a destager component 910 writes those older log records sequentially onto the end (e.g., end 913) of the growable log portion 902. In this manner, the growable log portion 902 grows sequentially in direction 923.

Thus, the fixed-size log portion 901 includes newer log records, which are the log records that are most often read from. On the other hand, the growable log portion 902 includes older log records that are less often read. Furthermore, the fixed-size log portion 901 will include the tail of the log, which is the last log record written to the log as a whole. In case of failure, it is important to be able to identify the tail of the log since that log record is the last log record that the log service has guaranteed will be executed even if there is a failure that occurs prior to the data operation represented by the log record having been completed. During recovery, the recovery process restores the last checkpoint, and redoes the data operations of each log record one at a time until the tail of the log is encountered.

The destager component 910 is an example of the log record consumers 130 of FIG. 1. The adjusting of in the log growth may include the reclaiming of old records from the persistent log by the log record remover 160. This removal process may be facilitated by each of the log record consumers providing a log processing parameter in the form of the earliest log sub-portion (e.g., virtual log file) needed. This would allow the log record remover 160 to remove sub-portions prior to all earliest log sub-portions needed across all of the log consumers.

For instance, suppose log record sub-portions are virtual log files that are added to the log with their identifiers incremented by one. Now suppose that log record consumer 131 has notified the log growth adjustment component 180 that the log record consumer 131 is consuming log records within virtual log file VLF 17, and based on current transactions, will not need log records within virtual log file VLF 15 or earlier. Also, suppose that the log record consumer 132 has notified the log growth adjustment component 180 that the log record consumer 132 is consuming log records within virtual log file VLF 16, and based on current transactions, will not need log records within virtual log file VLF 14 or earlier. Based on this, the log growth adjustment component 180 may notify (as represented by arrow 192) the log record remover 160 that all virtual log files earlier than VLF 15 may be removed.

Note that the log records written to the volume 335 may be optimized such that the more frequently accessed blocks (that include the most recent log records) are optimized so that any reader may read those blocks and access appropriate log records using only the log sequence number. Furthermore, the writes may happen during normal operation such that, in a subsequent recovery, the tail of the log may be quickly found, without having to expend effort reformatting the storage space in the fixed-size log portion. Thus, truly, the log service may acknowledge that the data operation is guaranteed to take place once the block having that log record is written into the log of the log environment 900 of FIG. 9. Lastly, because the fixed-size log portion is fixed in size, the management data of the drive 335 stays the same, and the drive 335 can thus be mounted to multiple computing systems.

Because the principles described herein operate in the context of a computing system, a computing system will be described with respect to FIG. 10. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 10:
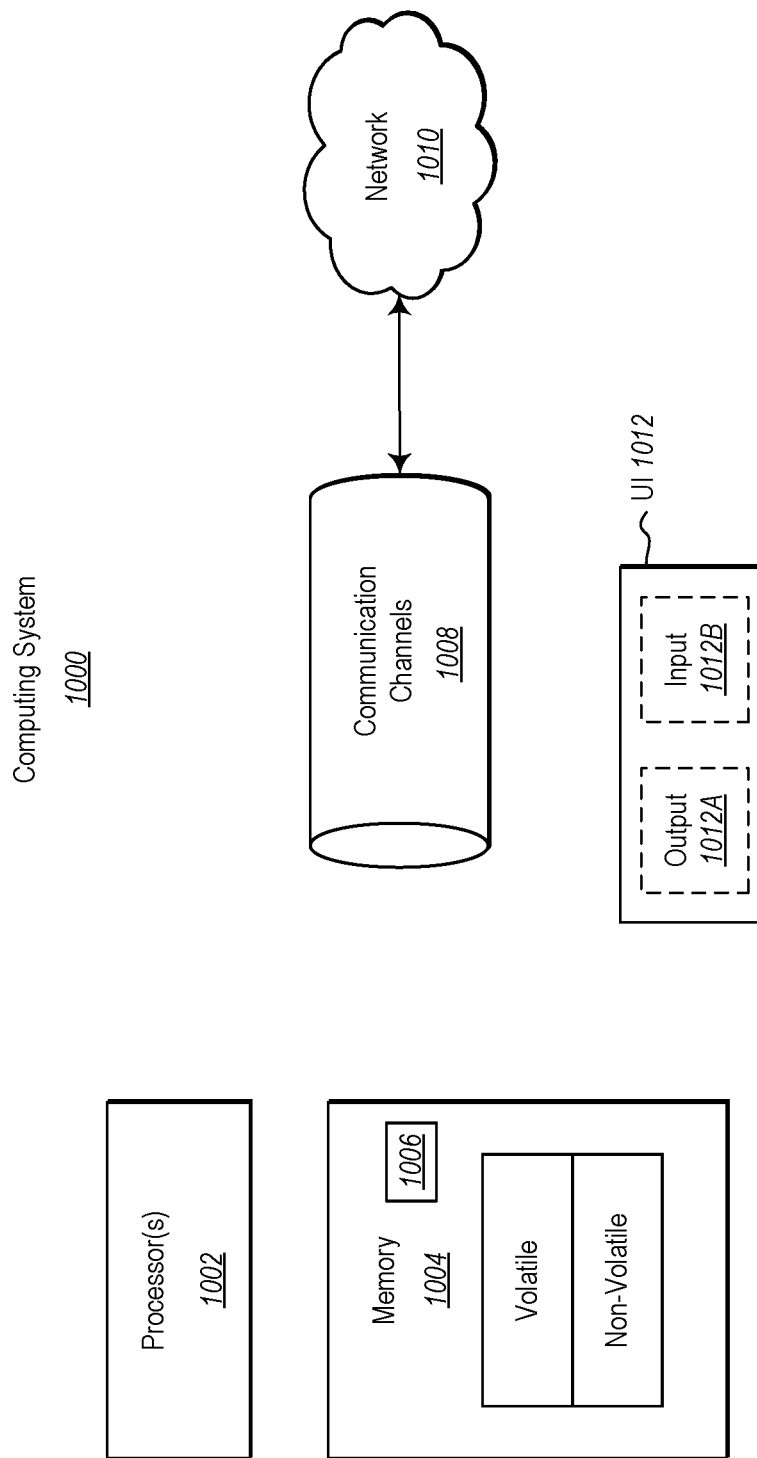
FIG. 10 illustrates an example computer system in which the principles described herein may be employed.

As illustrated in FIG. 10, in its most basic configuration, a computing system 1000 typically includes at least one hardware processing unit 1002 and memory 1004. The memory 1004 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1000 has thereon multiple structures often referred to as an "executable component". For instance, the memory 1004 of the computing system 1000 is illustrated as including executable component 1006. The executable component may be, for instance, the broker component 133 of FIG. 1. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 1004 of the computing system 1000. Computing system 1000 may also contain communication channels 1008 that allow the computing system 1000 to communicate with other computing systems over, for example, network 1010.

While not all computing systems require a user interface, in some embodiments, the computing system 1000 includes a user interface 1012 for use in interfacing with a user. The user interface 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, for instance, speakers, displays, tactile output, holograms, virtual reality, and so forth. Examples of input mechanisms 1012B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    one or more processors; and
    one or more computer-readable hardware storage devices that store instructions that are executable by the one or more processors to cause the computing system to make adjustments in a rate of growth of a persistent log by causing the computing system to at least:
        receive, from each log consumer included in a plurality of log consumers that consume log records recorded in the persistent log, a log processing parameter corresponding to said each log consumer with respect to the persistent log, wherein:
            the persistent log comprises a fixed-size log portion and a growable log portion,
            the log records recorded in the persistent log are generated by a log generator,
            the fixed-size log portion is written to in a circular manner such that, once the fixed-size log portion is full, an oldest log record in the fixed-size log portion is overwritten by a newest log record that is written to the fixed-size log portion, and
            prior to the oldest log record being overwritten, the oldest log record is sequentially written to an end of the growable log portion such that the growable log portion grows sequentially in length;
        use at least the received log processing parameters to determine an adjustment in the rate of growth of the persistent log, which adjustment in the rate of growth influences a size of the growable log portion but does not influence a size of the fixed-size log portion as a result of the size of the fixed-size log portion being fixed; and
        make the determined adjustment in the rate of growth of the persistent log, causing the log generator to adjust a rate of generation of log records.

2. The computing system in accordance with claim 1, the adjustment in the rate of growth being a slowing down of the rate of growth of the persistent log by slowing down a rate of log record generation by the log generator.

3. The computing system in accordance with claim 2, wherein at least one of the log processing parameters is a log consumption progress.

4. The computing system in accordance with claim 2, the log generator being a primary compute system.

5. The computing system in accordance with claim 4, at least one of the plurality of log consumers being a secondary compute system.

6. The computing system in accordance with claim 2, at least one of the plurality of log consumers being a storage segment server.

7. The computing system in accordance with claim 2, at least one of the plurality of log consumers being a destaging component that destages log records from the fixed-size log portion to the growable log portion of the persistent log.

8. The computing system in accordance with claim 1, the adjustment in the rate of growth being a reclaiming of old log records from the persistent log.

9. The computing system in accordance with claim 8, wherein at least one of the log processing parameters is an earliest log sub-portion needed.

10. The computing system in accordance with claim 9, the reclaimed old log records being those log records that are prior to all earliest log sub-portions needed across all of the plurality of log consumers.

11. The computing system in accordance with claim 1, wherein the instructions further cause the computing system to:
    receive, from each of the plurality of the log consumers that consume the log records from the persistent log, and for each of at least some storage segments, an earliest version of a storage segment that may be needed by the corresponding log consumer; and
    for each of the at least some storage segments, reclaim storage for all versions of the storage segment that are prior to an oldest version of the storage segment that may be needed by any of the plurality of log consumers.

12. A method for making adjustments in a rate of growth of a persistent log, the method comprising:
    receiving, from each log consumer in a plurality of log consumers that consume log records recorded in the persistent log, a log processing parameter corresponding to said each log consumer with respect to the persistent log, wherein:
        the persistent log comprises a fixed-size log portion and a growable log portion,
        the log records recorded in the persistent log are generated by a log generator,
        the fixed-size log portion is written to in a circular manner such that, once the fixed-size log portion is full, an oldest log record in the fixed-size log portion is overwritten by a newest log record that is written to the fixed-size log portion, and
        prior to the oldest log record being overwritten, the oldest log record is sequentially written to an end of the growable log portion such that the growable log portion grows sequentially in length;
    using at least the received log processing parameters to determine an adjustment in the rate of growth of the persistent log, which adjustment in the rate of growth influences a size of the growable log portion but does not influence a size of the fixed-size log portion as a result of the size of the fixed-size log portion being fixed; and
    making the determined adjustment in the rate of growth of the persistent log, causing the log generator to adjust a rate of generation of log records.

13. The method in accordance with claim 12, the adjustment in the rate of growth being a slowing down of the rate of growth of the persistent log by slowing down a rate of log record generation by the log generator.

14. The method in accordance with claim 13, wherein at least one of the log processing parameters is a log consumption progress.

15. The method in accordance with claim 13, the log generator being a primary compute system.

16. The method in accordance with claim 15, at least one of the plurality of log consumers being a secondary compute system.

17. The method in accordance with claim 12, the adjustment in the rate of growth being a reclaiming of old log records from the persistent log.

18. The method in accordance with claim 17, wherein at least one of the log processing parameters is an earliest log sub-portion needed.

19. The method in accordance with claim 18, the reclaimed old log records being those log records that are prior to all earliest log sub-portions needed across all of the plurality of log consumers.

20. One or more computer-readable hardware storage devices having stored thereon computer-executable instructions that are executable by one or more processors of a computing system to cause the computing system to make adjustments in a rate of growth of a persistent log by causing the computing system to at least:

receive, from each log consumer included in a plurality of log consumers that consume log records recorded in the persistent log, a log processing parameter corresponding to said each log consumer with respect to the persistent log, wherein the persistent log comprises a fixed-size log portion and a growable log portion, and wherein:
        the log records recorded in the persistent log are generated by a log generator,
        the fixed-size log portion is written to in a circular manner such that, once the fixed-size log portion is full, an oldest log record in the fixed-size log portion is overwritten by a newest log record that is written to the fixed-size log portion, and
        prior to the oldest log record being overwritten, the oldest log record is sequentially written to an end of the growable log portion such that the growable log portion grows sequentially in length;
    use at least the received log processing parameters to determine an adjustment in the rate of growth of the persistent log, which adjustment in the rate of growth influences a size of the growable log portion but does not influence a size of the fixed-size log portion as a result of the size of the fixed-size log portion being fixed; and
    make the determined adjustment in the rate of growth of the persistent log, causing the log generator to adjust a rate of generation of log records.

\* \* \* \* \*